March 16, 1954    R. W. WOLLENTIN ET AL    2,672,451
IMPROVED CADMIUM HALOPHOSPHATE PHOSPHORS
Filed Feb. 2, 1951
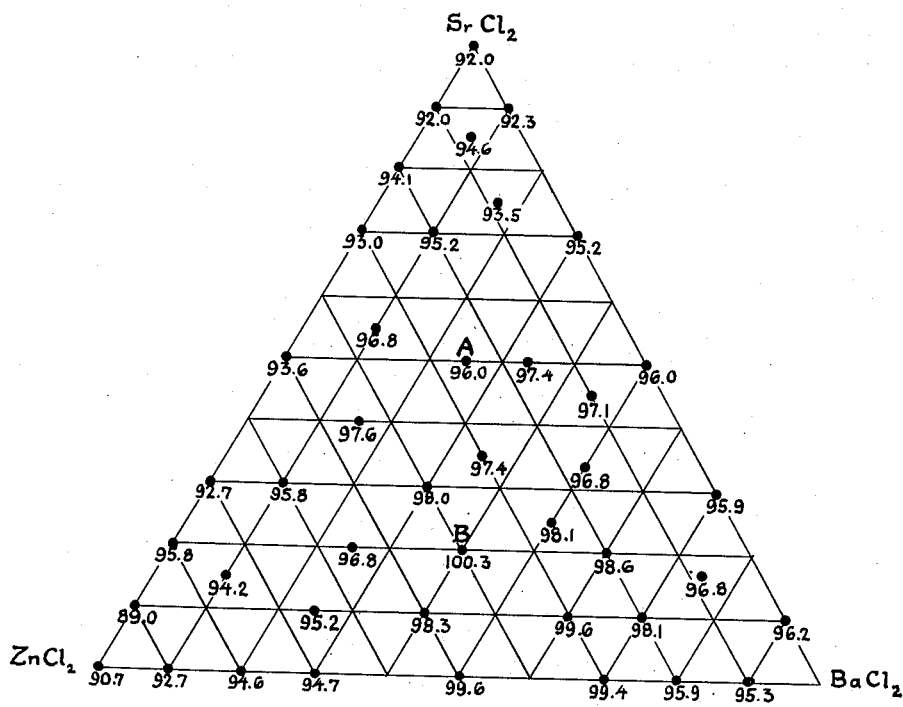
INVENTORS
R. W. WOLLENTIN
RUDOLPH NAGY.
BY
ATTORNEY Patented Mar. 16, 1954

2,672,451

UNITED STATES PATENT OFFICE 2,672,451

IMPROVED CADMIUM HALOPHOSPHATE PHOSPHORS

Robert W. Wollentin, Bloomfield, and Rudolph Nagy, Upper Montclair, N. J., assignors to Westinghouse Electric Corporation, East Pittsburgh, Pa., a corporation of Pennsylvania Application February 2, 1951, Serial No. 209,090

13 Claims. (Cl. 252—301.6)

This invention relates to phosphors, methods of making, and, more particularly, to an improved phosphor of the cadmium halophosphate type.

The principal object of our invention, generally considered, is to produce an efficient phosphor comprising cadmium phosphate activated by manganese, and halides supplied by material of the group consisting of a zinc halide, magnesium halide, strontium halide, and a compound of barium, such as the halide.

Another object of our invention is to increase the efficiency and stability of emission of cadmium halophosphate activated by manganese, by the inclusion of zinc halide, thereby causing a slight shift in the maximum of the emission spectrum from a normal peak at about 5900 A. U., toward the red, and broadening said spectrum on both the long and short wave-length sides.

A further object of our invention is to obtain the optimum efficiency in a manganese-activated cadmium halophosphate phosphor by employing, for each 3 moles of cadmium phosphate, about 0.6 mole of magnesium chloride and .4 mole of zinc chloride; with 0.2 mole of manganese, also incorporating from 0.25 to 0.5 mole excess of phosphate over that required to form the orthophosphate.

A still further object of our invention is to use strontium chloride in a manganese-activated cadmium chlorophosphate phosphor as a source of halide, and from 0.25 to 0.5 mole excess of phosphate, thereby improving the luminescent output.

Another object of our invention is to improve on the efficiency of manganese-activated cadmium halophosphates by the addition of barium chloride thereto.

A further object of our invention is to apply such luminescent materials, as above defined, to envelopes for fluorescent lamps as coatings of optimum thickness, and lehr them at optimum temperatures.

A still further object of our invention is to blend phosphors, such as those above defined, with supplementary luminescent materials in order to obtain white light of a desired quality.

An additional object of our invention is to use the carbonate as the source of cadmium in cadmium chlorophosphates, to thereby obtain some advantage, as compared with the use of the oxide.

Other objects and advantages become apparent as the description proceeds.

Referring to the drawing, the sole figure is a trilinear chart showing the effect on output of cation variation in the halogen-supplying portion of $3Cd_3(PO_4)_2.2(Sr,Zn,Ba)Cl_2:0.2Mn$, when the firing temperature is 750° C.

The luminescent materials known as the cadmium chlorophosphates activated by manganese have been used in such devices as low pressure mercury discharge lamps and cathode ray tubes to produce yellowish-pink light with an emission peak and about 5900 A. U. In the syntheses of these materials, the chloride component has been supplied by either magnesium chloride or cadmium chloride, the former producing the more efficient phosphors.

We have found that the efficiency of emission and the stability of the material under excitation can be improved by the inclusion of zinc chloride which, in conjunction with magnesium chloride, causes a slight shift of the peak of emission toward the red, a maximum of 50 A. U. It also broadens the emission spectrum on both the long and short wavelength sides. The overall effect is an increase in total lumens per watt output of a fluorescent lamp incorporating such an improved phosphor.

The degree of improvement is dependent upon the amount of zinc chloride incorporated. As a convenient method of representing the proportions of constituents, the following formula can be applied: $3Cd_3(PO_4)_2.(Mg,Zn)Cl_2:xMn$, wherein the total amount of halide may vary from 0.8 to 1.5 moles, and the mole ratio of zinc chloride to magnesium chloride does not exceed 2 to 3. A ratio to produce optimum efficiency is 3 moles $Cd_3(PO_4)_2$ to 0.6 mole of $MgCl_2$ and 0.4 mole $ZnCl_2$, with 0.2 mole $MnCl_2$. As ordinary magnesium chloride is a highly deliquescent material, and is therefore difficult to handle, we may use the same mole ratio of a fused magnesium chloride, or a fused magnesium oxychloride product obtainable and which corresponds essentially to the formulation $Mg_2OCl_2$, which is practically non-deliquescent and yields about the same results as the hydrated $MgCl_2$.

The amount of manganese in the formula can vary from 0.01 to 2.0 moles per 3.0 moles of $Cd_3(PO_4)_2$, but 0.1 to 0.3 or about 0.2 mole is considered to be optimum. Manganese may be introduced as the phosphate, the carbonate, the sulphate, the chloride, or as an oxide. The chloride gives better results than the phosphate, and the carbonate gives the lowest output.

It is highly advisable to incorporate at least 0.5 mole excess of phosphate over that required to form cadmium orthophosphate to produce a satisfactory white material. Lesser amounts lead to physical discoloration and greater amounts cause a slight shift of emission toward the red, accompanied by a decrease in fluorescent brightness.

The phosphor may be prepared by dry mixing, wet mixing, or precipitation methods. For example, a good dry mix method producing highly fluorescent material is to mix 231.1 grams of cadmium oxide (CdO), 198 grams of di-ammonium acid phosphate ($(NH_4)_2HPO_4$), 10.9 grams of zinc chloride ($ZnCl_2$), 24.4 grams of hydrated magnesium chloride ($MgCl_2.6H_2O$), and 7.92 grams of hydrated manganese chloride ($MnCl_2.4H_2O$), in a blending apparatus until the preliminary dry state reaction is complete, followed by a grinding operation, such as hammer milling or ball milling for one or more hours, and finally firing in a covered tray to prevent excessive volatilization for 1.5 to 4 hours at a temperature of 700° to 980° C., with shorter time for the higher temperature. The resultant material is soft, white, finely divided, and ready for use.

A wet mix method yielding satisfactory results is to use the same proportions as above, but add sufficient distilled water or acetone to make a thick paste and wet mill for at least two hours, preferably four hours, evaporate to dryness, crush and grind either by ball mill or hammer mill, and fire as in the dry method.

A precipitation method may be to dissolve 555.3 grams of hydrated cadmium nitrate $Cd(NO_3)_2.4H_2O$; 24.4 grams of hydrated magnesium chloride $MgCl_2 6H_2O$; 10.9 grams of zinc chloride; and 7.92 grams of hydrated manganese chloride $MnCl_2 4H_2O$; in 1.5 liters of boiling distilled water. Add slowly, with stirring, 198.5 grams of di-ammonium acid phosphate $(NH_4)_2HPO_4$, dissolved in 300 ml. of distilled water at 70° C. Evaporate to dryness, crush to a fine powder and fire as in the dry mix method.

In any of the above methods, any cadmium salt, such as cadmium carbonate ($Cd(CO_3)$), cadmium oxalate ($CdC_2O_4$), etc., which will combine upon heating with di-ammonium acid phosphate to produce cadmium phosphate, may be substituted for cadmium oxide (CdO) or hydrated cadmium nitrate ($Cd(NO_3)_2 4H_2O$). The improved phosphor, when incorporated with a device, such as a low pressure mercury vapor discharge lamp, would produce light at a greater efficiency and maintain a higher output throughout lamp life than a similar material not including zinc chloride in accordance with our invention.

Summarizing the results of including zinc chloride in a manganese activated cadmium phosphate phosphor, we would say that the presence of the zinc serves to spread the emission spectrum slightly, more predominately on the short wave-length side, causing the light to become more yellowish. In 40 watt fluorescent lamps, the improved phosphor gave 59.1 lumens per watt at zero, and 55.3 lumens per watt at 100 hours, compared with 48.7 at zero and 44.8 at 100 hours for the unimproved phosphor.

The following examples indicate how the proportions of ingredients in the mixture may be chosen.

*Example 1*

The raw materials may consist of:

|  | Moles | Grams (or Parts by Wt.) |
|---|---|---|
| Cadmium oxide (CdO) | 9.0 | 1,156 |
| Di-ammonium acid phosphate ($(NH_4)_2HPO_4$) | 7.50 | 990.7 |
| Hydrated magnesium chloride ($MgCl_2 6H_2O$) | 0.60 | 122.0 |
| Zinc Chloride ($ZnCl_2$) | 0.40 | 54.52 |
| Hydrated manganese chloride ($MnCl_2.4H_2O$) | 0.20 | 7.92 |

The chemicals employed are desirably of phosphor grade and mixed in a blender for about an hour. Fused magnesium chloride or magnesium oxychloride, in the same mole proportion, may be substituted for the hydrated magnesium chloride. At this stage a reaction sets in, as evidenced by the liberation of heat and ammonia fumes. The mixing is best completed by hammer milling, or ball milling for from 1 to 3 hours. Finally, the material is fired in covered silica dishes for 1 to 4 hours at temperatures from 700° to 980° C., preferably for one hour at about 800° C. for batches of the size above indicated. After reaction, the phosphor will have approximately the following mole composition.

$$3Cd_3(PO_4)_2.0.60MgCl_2.0.40ZnCl_2.0.2MnCl_2.0.75P_2O_5$$

*Example 2*

| | Moles |
|---|---|
| Cadmium carbonate ($CdCO_3$) | 9.0 |
| Di-ammonium acid phosphate | 7.5 |
| Hydrated magnesium chloride | .6 |
| Zinc chloride | 0.40 |
| Manganese carbonate ($MnCO_3$) | 0.2 |
| Ammonium chloride ($NH_4Cl$) | 0.4 |

The amount of manganese can be varied from .01 to 2.0 moles per 3.0 moles of cadmium phosphate, 0.2 mole being considered optimum. When the manganese is used as a carbonate, ammonium chloride (or its equivalent) must be added to keep the halide content the same. The cadmium component may be the oxide, carbonate, or any other such compound which upon heating is converted to the oxide. The parts by weight are obtainable by multiplying the number of moles by the molecular weight.

*Example 3*

| | Moles |
|---|---|
| Cadmium oxide | 9.0 |
| Di-ammonium acid phosphate | 7.5 |
| Zinc chloride | 1.0 |
| Hydrated manganese chloride | 0.2 |

By replacing all of the magnesium chloride by an equal mole proportion of zinc chloride, a phosphor is obtained that has a slightly greater emission of both the yellow and red proportions of the spectrum. This gives a broader emission band. The finished phosphor will have a mole composition indicated by the following formula:

$$3Cd_3(PO_4)_2.ZnCl_2.0.20MnCl_2.0.75P_2O_5$$

*Example 4 (wet method)*

| | Moles |
|---|---|
| Cadmium oxide | 9.0 |
| Phosphoric acid ($H_3PO_4$) | 7.5 |
| Hydrated magnesium chloride | 0.6 |
| Zinc chloride | 0.4 |
| Hydrated manganese chloride | 0.2 |

When the phosphor is made by the wet method, the cadmium oxide is suspended in water with a mechanical stirrer and well mixed with the chlorides. Phosphoric acid is then added, possibly as a liquid of specific gravity 1.17, containing 87.1% of the constituent, and the whole evaporated to dryness at about 130° C. The product is ground in a mortar, and heated as in Example #1.

Example 5

| | Grams (or parts by wt.) |
|---|---|
| Hydrated cadmium nitrate ($Cd(NO_3)_2 4H_2O$) | 555.3 |
| Di-ammonium acid phosphate | 198.5 |
| Hydrated magnesium chloride | 24.4 |
| Zinc chloride | 10.9 |
| Hydrated manganese chloride | 7.92 |

The cadmium nitrate is dissolved in 1.5 liters of boiling water and slowly added to the ammonium phosphate dissolved in one liter of boiling water. The precipitate is washed by decantation, resuspended in 2 liters of water containing 39.6 grams of di-ammonium acid phosphate, $(NH_4)_2HPO_4$. The manganese, magnesium, and zinc halides are dissolved in 200 ml. of water and mixed with the cadmium phosphate. The suspension is evaporated to dryness and fired as in Example #1.

We have found that strontium chloride may be used successfully as the source of halide and and allows a range of emission colors from 5900 A. U. to 6080 A. U.

In the preparation of our phosphors, we form a solid solution of tertiary cadmium phosphate, strontium chloride and manganese. A range of strontium chloride concentration of 0.01 mole of 5.0 moles per 3 moles of tertiary phosphate is allowable. Manganese may be present within the range of 0.001 mole to 2.0 moles per 3 moles of tertiary cadmium phosphate.

The optimum amounts of strontium chloride and manganese for producing maximum output are 2.0 and 0.2 moles, respectively per 3.0 moles of tertiary cadmium phosphate. These proportions yield a high output phosphor with an emission peak at 5900 A. U. Increasing the strontium chloride to 3.0 moles and the manganese to 1.0 mole (per 3.0 moles of tertiary cadmium phosphate) produce a maximum shift in the emission peak to 6080 A. U. Intermediate proportions of strontium and manganese produce emission peaks between 5900 A. U. and 6080 A. U. No advantage is known to be gained by exceeding 5.0 moles of strontium chloride and 2.0 moles of manganese, since higher amounts reduce the output of the resultant phosphors to below usable values.

In the manufacture of these materials, cadmium is preferably supplied by the oxide or carbonate, although any compound of cadmium that will react with a source of phosphate is allowable. The phosphate is preferably supplied as di-ammonium acid phosphate, although other sources such as mono-ammonium acid phosphate, phosphorous pentoxide, $P_2O_5$, or phosphoric acid are acceptable. Manganese is supplied preferably as the chloride, although other compounds such as the oxide, sulfate, nitrate, carbonate and phosphate have been used with equal success. An excess of 0.25 to 0.5 mole of phosphate per 3.0 moles of cadmium is necessary for highest efficiency in all of these strontium-containing phosphors.

The following examples are given to illustrate means for applying the fundamentals of our invention to actual practice.

Example 6

| | Moles |
|---|---|
| Cadmium oxide | 9.0 |
| Di-ammonium acid phosphate | 7.5 |
| Strontium chloride | 2.0 |
| Hydrated manganese chloride | 0.2 |

The raw materials are intimately mixed by grinding in a ballmill or by a preliminary blending operation, followed by hammer milling, and fired in a covered container for 1 to 4 hours at 950° C. to 600° C. respectively. A convenient heat treatment is 1½ hours at 800° C. in a covered silica tray. The resultant phosphor has 140% output compared to unmodified $Cd_3(PO_4)_2$:Mn, and an emission peak at 5900 A. U.

Example 7

| | Moles |
|---|---|
| Cadmium carbonate | 7.0 |
| Mono-ammonium acid phosphate | 7.5 |
| Strontium carbonate ($SrCO_3$) | 2.0 |
| Hydrated cadmium chloride ($CdCl_2 \cdot 2½H_2O$) | 2.0 |
| Manganese chloride | 0.2 |

This example is given to illustrate a second method of obtaining the same phosphor as in Example 6.

Example 8

The same procedure and proportions are used as in Example 6 except the strontium chloride is increased to 3.0 moles. The resultant phosphor has an emission peak at 5930 A. U. and appears more pink under excitation than the phosphor of Example 6.

Example 9

The same procedure and proportions are used as in Example 8 except that the manganese chloride is increased to 0.50 mole. The resultant phosphor has an emission peak at 5980 A. U. and appears more pink than the phosphor in Example 8.

Example 10

The same procedure and proportions are used as in Example 8, except that the manganese is increased to 1.0 mole. The resultant phosphor has an emission peak at 6080 A. U. and appears more pink than all the phosphors in Examples 6, 7, 8 and 9.

Example 11

The same procedure and proportions are used as in Example 10, except that the strontium chloride is reduced to 2.0 moles. The resultant phosphor has an emission peak at 5940 A. U., and is similar to the phosphor of Example 8, which has 3.0 moles of strontium chloride and 0.2 mole of manganese.

Example 12

The same proportions and procedure are used as in Example 11, except that the strontium chloride is increased to 5.0 moles. The resultant phosphor has an emission peak at 6020 A. U.

Phosphors, such as above disclosed, were measured for plaque brightness and made into 40 watt fluorescent lamps. The output in lumens per watt, and color at zero and 100 hours, were also obtained. Table I presents a summary of these data. A control halophosphate was run simultaneously. Values for zinc beryllium silicate were added for comparison. In a comparison of plaque brightnesses, the cadmium phosphates were outstanding. The preparation of cadmium halophosphate with magnesium and/or zinc produces about 16% greater output than zinc beryllium silicate and about 12% greater output than the standard 3500° white calcium halophosphate.

The phosphors containing two moles of strontium chloride and .2 mole of manganese and the magnesium-zinc halide combination yielded lumen values equal to zinc beryllium silicate at zero hours, with slightly better maintenance.

Color values for these lamps are also given in the last column of Table I. These values placed the color temperature in the vicinity of 2040° to 2250° Kelvin. The phosphor containing one mole of manganese and 2 moles of strontium and the magnesium-zinc phosphor fall on the same isotemperature line. However, the former is 20 M. P. C. D. below the black body line while the latter is only 2 M. P. C. D. below.

The phosphor containing 2.0 moles of strontium chloride and 0.2 mole of manganese is +2 M. P. C. D. at 2174° K. The remaining phosphor containing 4 moles of strontium had a color temperature of 2250° K. +4 M. P. C. D.

TABLE I

|  | Plaque Bright | Lumens Per Watt | | Percent Main. | 100 Hrs., Color | |
|---|---|---|---|---|---|---|
|  |  | 0 Hr. | 100 Hrs. |  | x | y |
| $3Cd_3(PO_4)_2 \cdot 0.66\ MgCl_2 \cdot 0.44\ ZnCl_2 : 0.2Mn$ | 93.3 | 68.2 | 61.4 | 89.5 | 520 | 412 |
| $3Cd_3(PO_4)_2 \cdot 2SrCl_2 : 0.2Mn$ | 89.3 | 65.7 | 60.5 | 92.3 | 510 | 419 |
| $3Cd_3(PO_4)_2 \cdot 2SrCl_2 : 1Mn$ | 75.8 | 43.9 | 39.7 | 90.3 | 507 | 392 |
| $(7Cd, 2Sr)(PO_4)_2 \cdot 2SrCl_2 : 0.2Mn$ | 84.4 | 54 | 32.3 | 57.0 | 502 | 420 |
| $3Ca_3(PO_4)_2 \cdot 1CaFCl : Sb : Mn$ | 83.0 | 72.7 | 66.8 | 91.8 | 406 | 391 |
| $ZnBeSiO_4 : Mn$ | 80.0 | 66.0 | 58.0 | 88.0 | 500 | 415 |

The $x$ and $y$ of Table I are two of the three standard trichromatic coefficients, $x, y, z$, set forth by the International Commission in Illumination. They denote the ratio of colors weighted by concise distribution curves accepted as standard and covering the entire visible spectrum. For further clarification see: Jour. Opt. Soc. Am., 23, 359 (1933).

The term M. P. C. D., previously used is an abbreviation of the words "minimum perceptible color difference." As the title implies, it is a unit accepted as standard to represent difference in color. For further information see: Bur. Standards, Jour. Research, 17, 771 (1936).

We have also found that barium additions to cadmium phosphate activated by manganese enhance the luminescence by nearly 45 per cent.

To accomplish this improvement, barium as the chloride for example, cadmium phosphate and manganese are caused to enter into solid solution by appropriate heat treatment. Barium chloride may be added in proportions ranging from 0.01 to 6.0 moles per three moles of tertiary cadmium phosphate. An optimum amount of 2.0 moles of barium per 3.0 moles of tertiary cadmium phosphate has been found to produce a maximum improvement of 45 per cent. The manganese may be varied from 0.01 to 2.0 moles per 3.0 moles of cadmium phosphate. However, 0.2 mole of manganese has been found to be optimum. No advantage is known to be gained by exceeding the limits as presented, since higher proportions of manganese and barium reduce the output of the resultant phosphors to below a usable intensity.

In the application of this invention to actual practice, we find a convenient source of the additive to be barium chloride of ordinary analytical reagent grade. However the barium may also be supplied as the carbonate, oxide, or any other compound that will react with the other components of the phosphor at the temperatures used in the heat treatment of the materials, provided the chloride is supplied by some source such as cadmium chloride. Cadmium is best supplied as the oxide, although other compounds such as the hydroxide, carbonate and phosphate have been found equally as effective. The phosphate may be supplied by the dibasic or monobasic ammonium salt, or in the event of a wet or precipitation method, it may be supplied as orthophosphoric acid. In any event, a 0.5 mole excess of phosphate per 3.0 moles of cadmium has been found to improve the output.

The following examples are offered to further demonstrate some compositions and methods that may be used in applying our invention to actual practice.

*Example 13*

|  | Moles |
|---|---|
| Cadmium oxide | 9.00 |
| Di-ammonium acid phosphate | 7.50 |
| Barium chloride ($BaCl_2$) | 2.00 |
| Hydrated manganese chloride | 0.20 |

The raw materials are intimately mixed by blending and grinding or hammer milling, or they may be milled in a wet state, such as in an acetone suspension. After mixing, and drying in the event of wet mixing, the powder is placed in a covered tray, or plugged tube, and fired for 1 to 4 hours at 950° C. to 600° C., respectively. For the above proportions, 1½ hours at 800° C. have been found to be convenient. Phosphors prepared according to these directions have displayed a 45 per cent improvement in fluorescence output over cadmium phosphate phosphors without the added barium chloride.

*Example 14*

|  | Moles |
|---|---|
| Cadmium carbonate | 7.00 |
| Di-ammonium acid phosphate | 7.50 |
| Barium carbonate ($BaCO_3$) | 2.00 |
| Hydrated cadmium chloride | 2.00 |
| Hydrated manganese chloride | 0.20 |

The same procedure is used as in Example 13. This example is given as an alternate method of deriving the same phosphor as that of Example 13.

*Example 15*

|  | Moles |
|---|---|
| Cadmium carbonate | 9.00 |
| Phosphoric acid | 7.50 |
| Barium chloride | 2.00 |
| Hydrated manganese chloride | 0.20 |

A solution is made of the barium and manganese chlorides. To this is added the cadmium carbonate and phosphoric acid. The mixture is then evaporated to dryness and ground, followed by a heat treatment as previously described. The resultant phosphor is the same as that of Examples 13 and 14.

In all of the foregoing examples we have disclosed improved phosphors which employ only one of the following substitutions:

(1) The introduction of zinc chloride into cadmium phosphate phosphors.

(2) The introduction of strontium into cadmium phosphate phosphors.

(3) The introduction of barium into cadmium phosphate phosphors.

We also propose to use combinations of any and all of the above modifications. That is, we propose to employ both (1) and (2), both (1) and (3), both (2) and (3), or all of (1), (2) and (3) in phosphors to get improvements over the unmodified cadmium phosphate phosphor.

The sole figure represents the outputs obtainable from combinations of zinc, barium and strontium chlorides in cadmium phosphate phosphor. The triaxial diagram denotes all possible combinations of zinc, barium and strontium chlorides in the formulation:

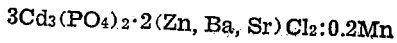

$$3Cd_3(PO_4)_2 \cdot 2(Zn, Ba, Sr)Cl_2 : 0.2Mn$$

The numerals superimposed on the chart represent plaque brightness values of the compositions represented by the periods. For example, a phosphor of composition A, would consist of the following ingredients by mole per cent; 25% $ZnCl_2$, 25% $BaCl_2$ and 50% $SrCl_2$ or by molar proportions would be represented by the formula:

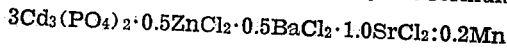

$$3Cd_3(PO_4)_2 \cdot 0.5ZnCl_2 \cdot 0.5BaCl_2 \cdot 1.0SrCl_2 : 0.2Mn$$

and would have a plaque brightness of 96.0.

However, there are two considerations concerning the sole figure which are not apparent, first, the effect of the temperature of preparation of the phosphors and, second, the effect of changing the ratio of cadmium phosphate to total halide.

All of the phosphors presented in the figure were subjected to two firings at 750° C. A maximum output was obtained at point B which corresponds to a composition of 40% zinc, 40% barium, and 20% strontium chlorides, or a formulation by moles of

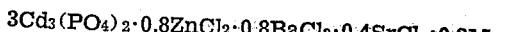

$$3Cd_3(PO_4)_2 \cdot 0.8ZnCl_2 \cdot 0.8BaCl_2 \cdot 0.4SrCl_2 : 0.2Mn$$

However, the brightnesses of the phosphors are dependent upon the temperature of preparation. In variations of zinc, barium and strontium halides, various optimum firing temperatures are incurred. For example, the optimum temperatures for high barium contents are near 700° C., for high strontium 850° C., and for high zinc 800° C. Therefore, in order to control as many variables as possible and prevent melting of high barium containing phosphors, the temperature of 750° C. was chosen. This, then, resulted in the optimum temperature for higher barium containing phosphors, and also resulted in underfiring the high strontium containing phosphors. Consequently, the selection of a higher firing temperature for the entire series would result in a displacement of the higher brightness values towards higher strontium containing phosphors since these would then be subjected to the optimum firing temperatures, whereas the compositions containing higher barium would be lower in output because of overfiring.

The second consideration concerns the mole ratio of total halide to cadmium phosphate. As is mentioned in the disclosure, the optimum amounts of zinc, barium and strontium are 1, 2 and 2 moles respectively per 3 moles of cadmium phosphate when each is used singly. The greatest of these is two moles of the chloride hence the chart of compositions is so chosen that all combinations provide a ratio of 3 moles of cadmium phosphate to 2 moles of total chlorides. However, it is permissible to choose a ratio of other than 3 to 2 as is presented in the chart. Actually, the total halide may be varied from .05 to 5.0 moles per 3 moles of cadmium phosphate. Such a change would cause a shift in the position of the maximum of point B. Consider, for example, a decrease to a total halide content of 1 mole per 3 moles of cadmium phosphate. The decrease would then favor the optimum amount of zinc chloride, which is 1.0 mole, and consequently shift the maximum towards the zinc chloride corner of the chart.

Consider, now, a change in the opposite direction, that is an increase in the total halide content to 5 moles of chlorides per 3 moles of cadmium phosphate. Since the increase to 5 moles constitutes a large excess over that amount which is optimum, that is a total of 2 moles, then the situation becomes one where the tolerability of the excess chlorides becomes important. That is, excess amounts of the three chlorides of zinc, barium, and strontium affect the brightness by variable degrees. The brightness is most sensitive to zinc, lesser to strontium, and least to barium excesses. Therefore, in mixtures of 5.0 moles of total chlorides, higher brightness values would be obtained nearer the barium corner of the chart.

To summarize the foregoing; the position of the maximum at point B in the figure is dependent upon the firing temperature of the phosphors and the ratio of total chlorides to cadmium phosphate. An increase in firing temperature shifts the maximum towards the strontium corner, a decrease in firing temperatures favors the barium corner. A decrease in total halide shifts the maximum toward the zinc corner and an increase in total chloride shifts the maximum towards the barium corner.

From the foregoing it will be seen that we have modified manganese activated cadmium phosphate in various ways, coated to optimum densities the phosphors so produced on bulbs, and baked in a lehr temperature range of 593° C. to 621° C. Such conditions yield higher zero and 100 hr. lumens per watt and maximum maintenance. The highest average values obtained were 68.2 and 61.2 lumens per watt at zero at 100 hrs. and in some instances 93.3% maintenance. Color analyses of these lamps indicate that the phosphor must be accompanied by small percentages of blue and green emitting phosphors to make conventional white fluorescent lamps.

The following are examples of the proportions which may be blended to produce approximately 3500° white fluorescent lamps:

*Example 16*

|  | Percent by weight |
|---|---|
| Phosphor of Example 1 | 80 to 86 |
| Zinc silicate phosphor | 10 to 7 |
| Magnesium tungstate phosphor | 10 to 7 |

*Example 17*

|  | Percent by weight |
|---|---|
| Phosphor of Example 3 | 82 to 88 |
| Zinc silicate phosphor | 9 to 6 |
| Magnesium tungstate phosphor | 9 to 6 |

*Example 18*

|  | Percent by weight |
|---|---|
| Phosphor of Example 6 | 79 to 85 |
| Zinc silicate phosphor | 9 to 6 |
| Magnesium tungstate phosphor | 12 to 9 |

*Example 19*

|  | Percent by weight |
|---|---|
| Phosphor of Example 10 | 78 to 85 |
| Zinc silicate phosphor | 14 to 10 |
| Magnesium tungstate phosphor | 8 to 5 |

Example 20

| | Percent by weight |
|---|---|
| Phosphor of Example 13 | 82 to 88 |
| Zinc silicate phosphor | 9 to 6 |
| Magnesium tungstate phosphor | 9 to 6 |

Increasing proportions of barium and strontium chlorides, above a certain minimum concentration, increase the output. The additions of various metal halides to a base material of tertiary cadmium phosphate activated by manganese has thus resulted in the formation of halophosphates with magnesium chloride, magnesium fluoride, zinc chloride, zinc fluoride, strontium chloride, and barium chloride, although examples giving only the chloride substitutions have been furnished. However, corresponding fluorides may in the examples be substituted, mole for mole.

Increasing amounts of strontium chloride with increasing amounts of manganese cause the peak emission to shift a maximum of 120 A. U. toward the red. However, if either manganese or strontium is held to a small amount, an increase in the other will not produce such a shift. The formula for maximum shift is $3Cd_3(PO_4)_2:3SrCl_2:1.0Mn$. Extremely high plaque brightness was obtainable from a formulation of $$3.0Cd_3(PO_4)_2:2.0SrCl_2:0.2Mn$$

and the emission is peaked at 5880 A. U. As the red emission has been fortified by the presence of strontium in the phosphor, it is possible to derive spectral distributions from a blend comparable to that obtainable by the use of zinc beryllium silicate. Barium additions result in fluorescent efficiencies equal to those obtainable by zinc and strontium additions. The replacement of cadmium oxide by cadium carbonate has been considered as a means of eliminating an unwanted reaction of the raw materials which caused troublesome caking and complications in mixing.

In the claims, the word "halogen" is to be interpreted as including only chlorine and fluorine, and the word "halide" is to be interpreted as including only chloride and fluoride.

Although preferred embodiments have been disclosed, it will be understood that modifications may be made within the spirit and scope of the invention.

We claim:

1. A luminescent composition consisting essentially of the fired reaction product of the following constituents in about the stated proportions: cadmium oxide, 9 moles; ammonium acid phosphate, 7.50 moles; magnesium chloride, 0.6 mole; zinc chloride, 0.4 mole; and manganese chloride, 0.2 mole.

2. A luminescent composition consisting essentially of the fired reaction product of the following constituents in about the stated proportions: cadmium carbonate, 9 moles; ammonium acid phosphate, 7.5 moles; magnesium chloride, 0.6 mole; zinc chloride, 0.4 mole; manganese carbonate, 0.2 mole; and ammonium chloride, 0.4 mole.

3. A luminescent composition consisting essentially of the fired reaction product of the following constituents in about the stated proportions; cadmium oxide, 9 moles; phosphoric acid, 7.5 moles; magnesium chloride, 0.6 mole; zinc chloride 0.4 mole, and manganese chloride, .2 mole.

4. A luminescent composition consisting essentially of the fired reaction product of the following constituents in about the stated proportions by weight: hydrated cadmium nitrate, 555.3; di-ammonium acid phosphate, 198.5; hydrated magnesium chloride, 24.4; zinc chloride, 10.9; and hydrated manganese chloride, 7.92.

5. A luminescent composition consisting essentially of the fired reaction product of the following constituents in about the stated proportions: cadmium oxide, 9 moles; di-ammonium acid phosphate, 7.5 moles; strontium chloride, 2.0 to 3.0 moles; and manganese chloride, .001 to 2.0 mole.

6. A luminescent composition consisting essentially of the fired reaction product of the following constituents in about the stated proportions: cadmium carbonate, 7.0 moles; monoammonium acid phosphate, 7.5 moles; strontium carbonate 2.0 to 3.0 moles, cadmium chloride 2.0 moles; and manganese chloride, .001 to 2.0 moles.

7. A luminescent composition consisting essentially of the fired reaction product of the following constituents in about the stated proportions; cadmium oxide, 9 moles; di-ammonium acid phosphate, 7.5 moles; barium chloride, 2 moles; and manganese chloride, 0.2 mole.

8. A luminescent composition consisting essentially of the fired reaction product of the following constituents in about the stated proportions: cadmium carbonate, 7 moles; di-ammonium acid phosphate, 7.5 moles; barium carbonate, 2 moles; cadmium chloride, 2 moles; and manganese chloride, 0.2 mole.

9. A luminescent composition consisting essentially of the fired reaction product of the following constituents in about the stated proportions: cadmium carbonate, 9 moles; phosphoric acid, 7.5 moles; barium chloride, 2 moles; and manganese chloride, 0.2 mole.

10. The method of manufacturing a fluorescent lamp, comprising applying a luminescent composition consisting of cadmium orthophosphate, a halide formed by one of the group consisting of chlorine and fluorine and at least one of the group consisting of magnesium, zinc, strontium, and barium, and manganese in activator proportions; having the gram molecular formula:

$$3Cd_3(PO_4)_2 \cdot vMgL_2 \cdot wZnL_2 \cdot xSrL_2 \cdot yBaL_2:zMn$$

where L stands for a halogen of the group consisting of chlorine and fluorine; $v$ is a number lying in the range between and including .05 and 3; $w$ is a number not higher than 3; $x$ is a number not higher than 5; $y$ is a number not higher than 3; $z$ is a number lying in the range between and including 0.01 and 2; where $v$ is zero if $x$ or $y$ is higher than zero; where the proportion of only as many as two of the zinc, strontium and barium components, may be zero; and where the sum of $v, w, x$ and $y$ is a number lying in the range between and including .05 and 5, to the interior surface of its envelope and then lehring said envelope at a temperature of from 593° C. to 621° C.

11. The method of making a luminescent composition which will give a white color, comprising blending from 78% to 88% of a phosphor consisting of cadmium orthophosphate, a halide formed by one of the group consisting of chlorine and fluorine and at least one of the group consisting of magnesium, zinc, strontium, and barium, and manganese in activator proportions; having the gram molecular formula:

$$3Cd_3(PO_4)_2 \cdot vMgL_2 \cdot wZnL_2 \cdot xSrL_2 \cdot yBaL_2:zMn$$

where L stands for a halogen of the group consisting of chlorine and fluorine; $v$ is a number lying in the range between and including .05 and 3; $w$ is a number not higher than 3; $x$ is a number not higher than 5; $y$ is a number not higher than 3; $z$ is a number lying in the range between and including 0.01 and 2; where $v$ is zero if $x$ or $y$ is higher than zero; where the proportion of only as many as two of the zinc, strontium and barium components, may be zero; and where the sum of $v$, $w$, $x$ and $y$ is a number lying in the range between and including .05 and 5, with from 14% to 6% of zinc silicate and from 12% to 5% of magnesium tungstate.

12. A luminescent composition consisting of cadmium orthophosphate, a halide formed by one of the group consisting of chlorine and fluorine and at least one of the group consisting of magnesium, zinc, strontium, and barium, and manganese in activator proportions; having the gram molecular formula:

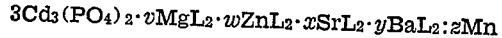

$$3Cd_3(PO_4)_2 \cdot vMgL_2 \cdot wZnL_2 \cdot xSrL_2 \cdot yBaL_2 : zMn$$

where L stands for a halogen of the group consisting of chlorine and fluorine; $v$ is a number lying in the range between and including .05 and 3; $w$ is a number lying in the range not higher than 3; $x$ is a number lying in the range not higher than 5; $y$ is a number lying in the range not higher than 3; $z$ is a number lying in the range between and including 0.01 and 2; where $v$ is zero if $x$ or $y$ is higher than zero; where the proportion of only as many as two of the zinc, strontium and barium components, may be zero; and where the sum of $v$, $w$, $x$ and $y$ is a number lying in the range between and including .05 and 5.

13. The method of making a phosphor of the cadmium phosphate type with a high output, comprising intimately mixing about 231.1 grams of cadmium oxide, 198 grams of di-ammonium acid phosphate, 10.9 grams of zinc chloride, 24.4 grams of hydrated magnesium chloride, 7.92 grams of hydrated manganese chloride, until the preliminary dry state reaction is complete, grinding for at least one hour, and finally firing in a covered tray for 1½ to 4 hours at a temperature of 700° C. to 980° C., the shorter time for the higher temperature.

ROBERT W. WOLLENTIN.
RUDOLPH NAGY.

References Cited in the file of this patent

UNITED STATES PATENTS

| Number | Name | Date |
|---|---|---|
| 2,191,351 | McKeag | Feb. 20, 1940 |
| 2,488,733 | McKeag | Nov. 22, 1949 |
| 2,605,227 | Fonda | July 29, 1952 |